US006884196B1

(12) United States Patent
Ziech

(10) Patent No.: US 6,884,196 B1
(45) Date of Patent: Apr. 26, 2005

(54) INTER-AXLE DIFFERENTIAL WITH IMPROVED DIFFERENTIAL GEAR MOUNTING ARRANGEMENT

(75) Inventor: James F. Ziech, Kalamazoo, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/616,166

(22) Filed: Jul. 9, 2003

(51) Int. Cl.$^7$ ............................................. F16H 48/06
(52) U.S. Cl. ..................................................... 475/230
(58) Field of Search ........................................ 475/230

(56) References Cited

U.S. PATENT DOCUMENTS

| | | |
|---|---|---|
| 2,355,144 A | 8/1944 | Carlson |
| 4,455,889 A | 6/1984 | Hauser |
| 5,545,102 A | 8/1996 | Burgman et al. |
| 5,823,908 A | 10/1998 | Stefanek |
| 5,863,271 A | 1/1999 | Schreier et al. |
| 5,897,452 A | 4/1999 | Schreier et al. |
| 5,899,826 A | 5/1999 | Schreier et al. |
| 6,190,281 B1 | 2/2001 | Oates |
| 6,645,113 B2 | 11/2003 | Orr et al. |

Primary Examiner—Dirk Wright
(74) Attorney, Agent, or Firm—Dykema Gossett PLLC

(57) ABSTRACT

An improved inter-axle differential is provided that eliminates the need for a differential case to retain the differential gears. A thrust washer and a retaining ring are disposed on each arm of a differential spider to retain a corresponding differential gear. The combination of the thrust washer and the retaining ring reduces the complexity and the weight of conventional inter-axle differential assemblies and enables improved splash lubrication of the differential.

18 Claims, 2 Drawing Sheets

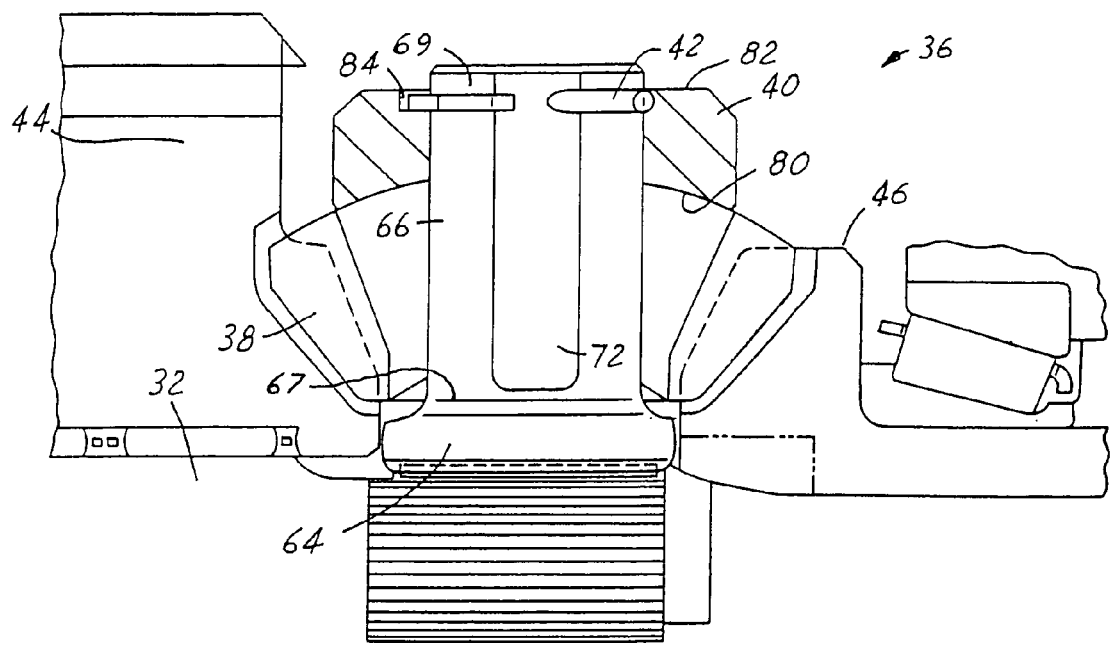
FIG. 2
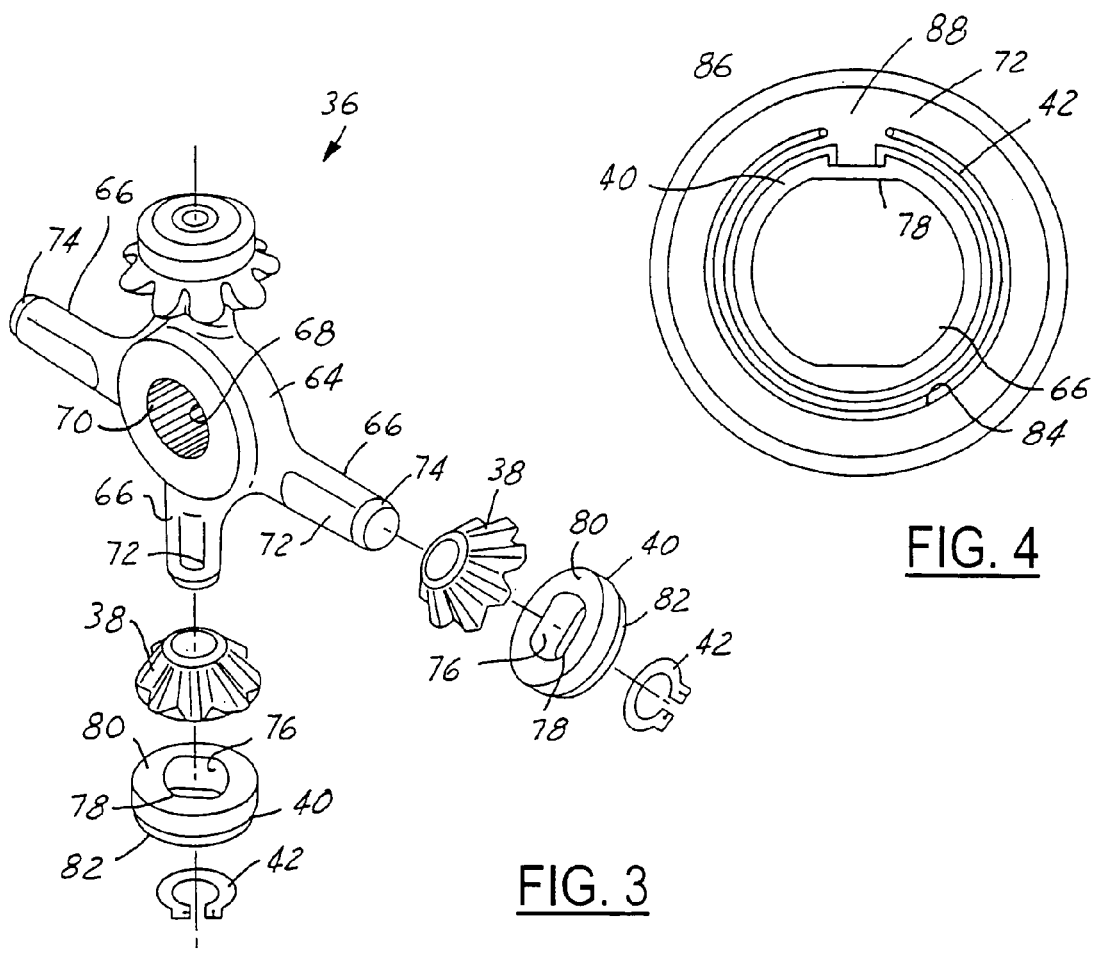
FIG. 3
FIG. 4

INTER-AXLE DIFFERENTIAL WITH IMPROVED DIFFERENTIAL GEAR MOUNTING ARRANGEMENT

BACKGROUND OF THE INVENTION

1. Field of the Invention

The present invention relates to an inter-axle differential, and more particularly, to an improved structure for mounting differential gears in the differential.

2. Discussion of Related Art

Motor vehicles with solidly connected multiple drive axles are commonly equipped with an inter-axle differential when there is any physical requirement for speed difference between the drive axles, e.g., to allow torque balance between the drive axles during the vehicle cornering, to compensate for tire size differences, etc. Inter-axle differentials are widely employed for tandem drive axles of heavy-duty trucks for on- and off-road service as a power divider.

A conventional inter-axle differential includes a spider that is rotatably driven by a power input shaft. The spider includes a plurality of radially outwardly extending arms each of which includes a pinion gear. Rotation of the spider and pinion gears causes a corresponding rotation in side gears that are configured to indirectly transmit power to first and second axles of a vehicle. The pinion gears are typically retained on the spider arms by a hardened differential case. The use of a differential case, however, reduces the accessibility of the pinion gears for required lubrication and also reduces the space available for the gears. Several attempts have been made to eliminate the need for a differential case. See, e.g., U.S. Pat. No. 5,823,908, U.S. Pat. No. 5,897,452, and/or U.S. Pat. No. 6,190,281. In each of these inter-axle differentials, however, the mechanism used to retain the pinion gears on the spider can spin off or become loose due to centrifugal forces acting on the retaining mechanisms.

The inventors herein have recognized a need for an inter-axle differential that will minimize and/or eliminate one or more of the above-identified deficiencies.

SUMMARY OF THE INVENTION

The present invention provides an inter-axle differential.

An inter-axle differential assembly in accordance with the present invention includes an input shaft disposed about a first axis and an output shaft coaxial with the input shaft. The inter-axle differential assembly also includes a spider coupled to the output shaft and having a plurality of radially outwardly extending arms. The inter-axle differential further includes a plurality of differential gears mounted on the spider with one of the plurality of differential gears disposed about one arm of the plurality of arms of the spider. The inter-axle differential assembly further includes a thrust washer disposed about the one arm radially outwardly of the one gear and a retaining ring disposed in a groove in the one arm radially outwardly of the thrust washer. Finally, the inter-axle differential includes first and second side gears in mesh with the differential gears. The first and second side gears are configured to transmit power to first and second axles of a vehicle.

An inter-axle differential in accordance with the present invention is advantageous as compared to conventional inter-axle differentials. The inventive differential eliminates the need for a differential case. As a result, the complexity, weight and cost of the differential are reduced and better splash lubrication is enabled. Further, the thrust washer and retaining ring in the inventive differential are not subject to being spun off or otherwise becoming loose from centrifugal force acting on the pinion gears during movement.

These and other features and objects of this invention will become apparent to one skilled in the art from the following detailed description and the accompanying drawings illustrating features of this invention by way of example.

BRIEF DESCRIPTION OF THE DRAWINGS

FIG. 2 is a detailed view of an inter-axle differential assembly in accordance with the present invention.

FIG. 3 is an exploded view of several components of an inter-axle differential in accordance with the present invention.

FIG. 4 is a plan view of several components of an inter-axle differential in accordance with the present invention.

DETAILED DESCRIPTION OF EMBODIMENTS OF THE INVENTION

Figure 1:
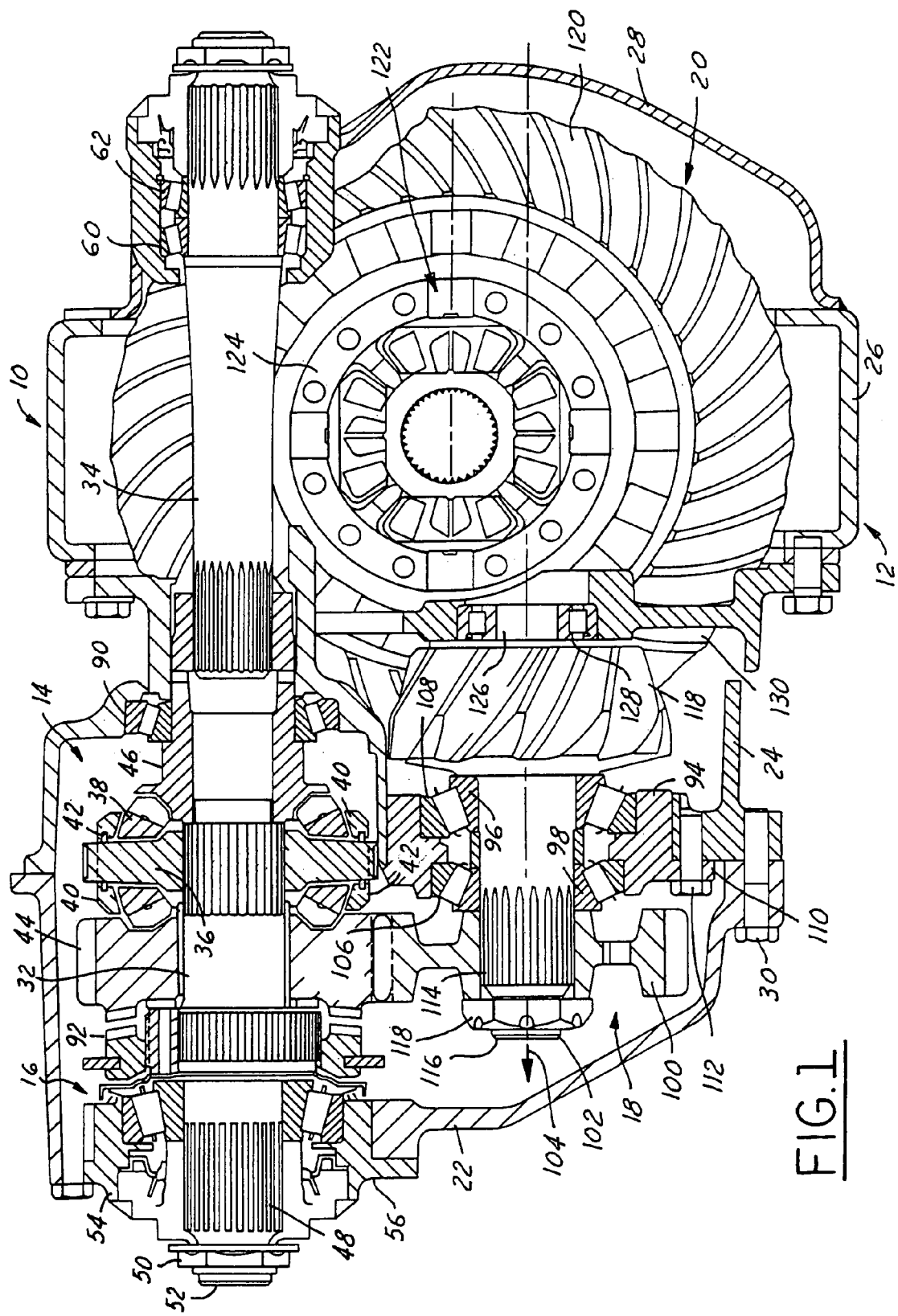
FIG. 1 is a cross sectional view of an axle assembly incorporating an inter-axle differential in accordance with the present invention.

Referring now to the drawings wherein like reference numerals are used to identify identical components in the various views, FIG. 1 illustrates an axle assembly 10 of a tandem axle assembly. Assembly 10 may comprise a forward axle assembly and is provided to drive wheels (not shown) supported on either side of assembly 10 on axle half shafts (not shown) extending from axle assembly 10. Assembly 10 may include a housing 12, an inter-axle differential 14, a differential locking device, such as clutch 16, a pinion shaft assembly 18, and a differential gear assembly 20.

Housing 12 provides structural support for the other components of assembly 10. Housing 12 also protects the other components of assembly 10 from foreign objects and elements. Housing 12 may be made from conventional metals and metal alloys such as steel and may include multiple members 22, 24, 26, 28 that are sized relative to components of assembly 10 and coupled together using conventional fasteners 30.

Inter-axle differential 14 is provided to divide power between assemblies 12 and another axle assembly (not shown) of a tandem axle assembly. In accordance with the present invention, differential 14 may include an input shaft 32, an output shaft 34, a spider 36, differential gears 38, thrust washers 40, retaining rings 42, and side gears 44, 46.

Input shaft 32 is provided to transmit power from a power input shaft (not shown) to spider 36 and is conventional in the art. Input shaft 32 is driven by the power input shaft through a conventional input yoke (not shown). The input yoke may be splined to the forward end of input shaft 32 on splines 48 and may be retained thereon by a nut 50 and a washer (not shown) which are disposed about a threaded stud 52 that extends from the forward end of shaft 32 and is integral therewith. A cap 54 may be disposed about the input yoke and is received within an opening in housing member 22. Shaft 32 is journalled for rotation within an opening in cap 54 by bearings 56 disposed within the opening.

Output shaft 34 is provided to transmit a portion of the power provided by input shaft 32 to an intermediate drive shaft assembly (not show) disposed between the forward and rear axle assemblies of the tandem axle assembly. Shaft 34 is coaxially disposed relative to input shaft 32. Shaft 34 extends through openings in housing members 24, 26, 28, respectively, and is journalled within an opening of housing member 28 by bearings 60, 62.

Spider 36 provides a mounting arrangement for bevel gears 38. Spider 36 may be coupled to input shaft 32 for rotation therewith using a spline connection or in other ways customary in the art. Alternatively, spider 36 may be made integral with input shaft 32. Referring now to FIGS. 2–3, spider 36 may have a body 64 and a plurality of arms 66 extending radially outwardly from body 64.

Body 64 may be substantially circular in shape and may define a central aperture 68. Body 64 may also define a radially inner surface having a plurality of splines 70 configured to mate with corresponding splines on shaft 32.

Each of arms 66 is substantially circular in construction and includes radially inner and outer portions 67, 69. Outer portion 69 of each arm 66, however, defines flats 72 located on diametrically opposite sides of arm 66 and designed to allow passage of lubricant between arm 66 and a corresponding differential gear 38. Referring to FIG. 3, in accordance with the present invention, flats 72 extend radially from a point proximate the radially inner end of arm 66 to the radially outer end of arm 66. Each arm 66 also defines a circumferential groove 74 proximate a radially outer end of the arm 66 for a purpose described hereinbelow.

Differential gears 38 are provided to divide and transfer torque from input shaft 32 to side gears 44, 46. Gears 38 are conventional in the art and may be made from conventional metals and metal alloys. Gears 38 are mounted on arms 66 of spider 36 as described in greater detail hereinbelow for rotation with spider 36 and input shaft 32. The teeth on gears 38 engage corresponding teeth on gears 44, 46.

Washers 40 are provided to absorb the radially outward pressure generated by gears 38 of differential 14. Washers 40 may be made from conventional metals and metal alloys including powdered metals. Washers 40 are disposed about each arm 66 of spider 36 and each washer 40 has a central aperture 76 sized to receive a corresponding arm 66. Aperture 76 is shaped complementary to arm 66 and, in particular, aperture 76 defines flats 78 diametrically opposite and configured to align with flats 72 on arm 66. As a result, washer 40 is held against rotation on arm 66 and is not subject to loosening or being spun off of arm 55 during motion of differential 14. Washer 40 defines a radially inner concave spherical surface 80 shaped complementary to a radially outer convex spherical surface of a corresponding differential gear 38. Washer 40 also has a radially outer surface 82 that defines a recess 84 configured to receive a retaining ring 42. Finally, and with reference to FIG. 4, washer 40 defines a tab 86 that extends into recess 84 for a purpose described hereinbelow. Tab 86 is axially aligned with flats 78 of washer 40 and flats 72 of arm 66 when washer 40 is assembled on arm 66.

Retaining rings 42 are provided to retain washers 40 and gears 38 on arms 66 of spider 36. Rings 42 are conventional in the art. Ring 42 may be substantially circular having elastically deformable ends that define a gap 88 formed in ring 42. It should be understood, however, that the size and shape of ring 42 may be varied without departing from the spirit of the present invention. Ring 42 is received within recess 84 of washer 40 and within groove 74 of arm 66. Ring 42 is oriented by virtue of tab 86 on washer 40. Referring to FIG. 4, tab 86 extends into gap 88. In this manner, the gap 88 formed in ring 42 is aligned with flats 72 on arm 66 so that the remainder of ring 42 engages the surface of arm 66 and maximum engagement of ring 42 and arm 66 is ensured.

Referring again to FIG. 1, side gears 44, 46 transfer torque from differential gears 38 to pinion shaft assembly 18 and output shaft 34, respectively. Gears 44, 46 are conventional in the art and may be made from conventional metals and metal alloys. Gear 44 is disposed about input shaft 32 and is freely rotatable thereon, being journalled on shaft 32 by bearings (not shown). Gear 44 includes a first set of teeth on a forward planar surface which form a first member of clutch 16 and a second set of teeth disposed on a rear planar surface that engage the teeth of differential gears 38. Gear 44 further includes a third set of teeth disposed about the radial periphery of gear 44 for a purpose described hereinbelow. Gear 46 is disposed about shaft 34 near the forward end of shaft 34 and may be coupled thereto by mating splines (not shown) on gear 46 and shaft 34. Gear 46 is journalled for rotation within housing member 24 by bearings 90.

Clutch 16 is provided to selectively lock differential 14 and is conventional in the art. In the illustrated embodiment, clutch 16 comprises a conventional sliding dog clutch that may be engaged by shifting a clutch member 92 with a first set of teeth into engagement with a clutch member (gear 44 in the illustrated embodiment) having a second set of teeth using a shifting fork.

Pinion shaft assembly 18 transfers torque from gear 44 to differential gear assembly 20. Assembly 18 may include a bearing cage 94, bearings 96, 98 a driven gear 100, and a pinion shaft 102.

Bearing cage 94 provides structural support and positions other components of assembly 18. Cage 94 may be made from conventional metals and metal alloys and is disposed about an axis 104 extending through pinion shaft 102. Cage 94 defines axially aligned openings 106, 108 configured to receive bearings 96, 98. Cage 94 also defines a mounting flange 110 through which cage 94 may be coupled to housing member 24 using one or more conventional fasteners 112 such as screws or bolts.

Bearings 96, 98 enable rotation of pinion shaft 102 relative to bearing cage 94. Bearings 96, 98 are conventional in the art and may comprise tapered roller bearings. Bearings 96, 98 are disposed within openings 106, 108 of cage 94 and are disposed about axis 104.

Driven gear 100 transmits torque from side gear 44 of inter-axle differential 14 to pinion shaft 102. Driven gear 100 may comprise a helical gear having teeth disposed about its radial periphery which engage corresponding teeth on side gear 44. Gear 100 may be drivingly coupled to shaft 102 through axially-extending splines 114 on shaft 102.

Pinion shaft 102 transmits torque to differential gear assembly 20 and is conventional in the art. Shaft 102 is disposed about axis 104 and is supported for rotation within openings 106, 108 of cage 94 by bearings 96, 98. A forward axial end of shaft 102 may define an integral threaded stud 116 configured to receive a nut 118 used to retain gear 100 on shaft 102.

Differential gear assembly 20 is provided to allow the wheels supported on either side of axle assembly 10 to rotate at different speeds. Assembly 20 may include a pinion gear 118, a ring gear 120, and a conventional bevel gear set 122 disposed within a differential case 124.

Pinion gear 118 is provided to transfer torque from pinion shaft 102 to ring gear 120. Pinion gear 118 may be made from conventional metals and metal alloys and may comprise a hypoid gear. Gear 118 rotates about axis 104. Gear 118 is disposed about shaft 102 and may be mounted thereto using a conventional spline connection or in other ways customary in the art. Gear 118 may also include a pilot portion 126 extending rearwardly that is supported for rotation by bearings 128 disposed in a pilot web 130 of housing member 24.

Ring gear 120 is provided to transfer torque from pinion gear 118 to bevel gear set 122 and is conventional in the art. Ring gear 120 may also be made from conventional metals and metal alloys and may also comprise a hypoid gear. Gear 120 is affixed to case 124 or may be integral therewith.

An inter-axle differential in accordance with the present invention is an improvement as compared to conventional inter-axle differentials. First, the inventive differential does not require a differential case to maintain the differential gears on the spider thereby reducing the complexity, weight, and cost of the differential and improving splash lubrication of the differential gears. Second, The washer and retaining ring of the inventive differential are not subject to being spun off the spider or otherwise being loosened due to the centrifugal forces inherent in the motion of the differential.

While the invention has been particularly shown and described with reference to the preferred embodiments thereof, it is well understood by those skilled in the art that various changes and modifications can be made in the invention without departing from the spirit and scope of the invention.

I claim:

1. An inter-axle differential, comprising:
   an input shaft disposed about a first axis;
   an output shaft coaxial with said input shaft;
   a spider coupled to said input shaft, said spider having a plurality of radially outwardly extending arms;
   a plurality of differential gears mounted on said spider, one of said plurality of differential gears disposed about one arm of said plurality of arms;
   a thrust washer disposed about said one arm, radially outwardly of said one gear;
   a retaining ring disposed in a groove in said one arm radially outwardly of said thrust washer; and
   first and second side gears in mesh with said differential gears, said first and second side gears configured to transmit power to first and second axles of a vehicle.

2. The inter-axle differential of claim 1, wherein said thrust washer includes a radially inner concave spherical surface and a radially outer surface having a recess formed therein.

3. The inter-axle differential of claim 1, wherein a radially outer surface of said thrust washer defines a recess configured to receive said retaining ring.

4. The inter-axle differential of claim 3, wherein said thrust washer includes a tab extending into said recess and into a gap formed in said retaining ring.

5. The inter-axle differential of claim 1, wherein said thrust washer defines a tab that extends into a gap in said retaining ring.

6. The inter-axle differential of claim 1 wherein none of said plurality of differential gears and said first and second side gears are disposed within a differential case.

7. An inter-axle differential, comprising:
   an input shaft disposed about a first axis;
   an output shaft coaxial with said input shaft;
   a spider coupled to said input shaft, said spider having a plurality of radially outwardly extending arms and at least one of said arms having:
   a radially inner portion; and,
   a radially outer portion;
   said inner and outer portions substantially circular in shape and said outer portion defining flats;
   a plurality of differential gears mounted on said spider, one of said plurality of differential gears disposed about said inner portion of said one arm;
   a thrust washer disposed about said outer portion of said one arm, said thrust washer having a central bore shaped complementary to said outer portion of said arm;
   a retaining ring disposed in a groove in said one arm radially outwardly of said thrust washer; and,
   first and second side gears in mesh with said differential gears, said first and second side gears configured to transmit power to first and second axles of a vehicle.

8. The inter-axle differential of claim 7, wherein said thrust washer includes a radially inner concave spherical surface and a radially outer surface having a recess formed therein.

9. The inter-axle differential of claim 7, wherein a radially outer surface of said thrust washer defines a recess configured to receive said retaining ring.

10. The inter-axle differential of claim 9, wherein said thrust washer includes a tab extending into said recess and into a gap formed in said retaining ring.

11. The inter-axle differential of claim 7, wherein said thrust washer defines a tab that extends into a gap in said retaining ring.

12. The inter-axle differential of claim 7 wherein a gap in said retaining ring is aligned with one of said flats in said radially outer portion of said at least one arm.

13. An inter-axle differential, comprising:
    an input shaft disposed about a first axis;
    an output shaft coaxial with said input shaft;
    a spider coupled to said input shaft, said spider having a plurality of radially outwardly extending arms and at least one of said arms having:
    a radially inner portion; and,
    a radially outer portion;
    said inner and outer portions substantially circular in shape and said outer portion defining a flat;
    a plurality of differential gears mounted on said spider, one of said plurality of differential gears disposed about said inner portion of said one arm;
    a thrust washer disposed about said outer portion of said one arm, said thrust washer having a central bore shaped complementary to said outer portion of said arm;
    a retaining ring disposed in a groove in said one arm radially outwardly of said thrust washer; and,
    first and second side gears in mesh with said differential gears, said first and second side gears configured to transmit power to first and second axles of a vehicle.

14. The inter-axle differential of claim 13 wherein said thrust washer includes a radially inner concave spherical surface and a radially outer surface having a recess formed therein.

15. The inter-axle differential of claim 13, wherein a radially outer surface of said thrust washer defines a recess configured to receive said retaining ring.

16. The inter-axle differential of claim 13, wherein said thrust washer includes a tab extending into said recess and into a gap formed in said retaining ring.

17. The inter-axle differential of claim 13, wherein said thrust washer defines a tab that extends into a gap in said retaining ring.

18. The inter-axle differential of claim 13 wherein a gap in said retaining ring is aligned with said flat in said radially outer portion of said at least one arm.

* * * * *